(12) United States Patent
Cofler et al.

(10) Patent No.: US 7,013,256 B2
(45) Date of Patent: **\*Mar. 14, 2006**

(54) COMPUTER SYSTEM WITH DEBUG FACILITY

(75) Inventors: Andrew Cofler, Voreppe (FR); Laurent Wojcieszak, Meylan (FR); Arnaud Dehamel, Grenoble (FR); Isabelle Sename, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 715 days.

This patent is subject to a terminal disclaimer.

(21) Appl. No.: 10/021,269

(22) Filed: Dec. 12, 2001

(65) Prior Publication Data

US 2002/0174385 A1 Nov. 21, 2002

Related U.S. Application Data (63) Continuation of application No. 09/748,075, filed on Dec. 22, 2000, now abandoned.

(30) Foreign Application Priority Data

Dec. 23, 1999 (GB) ..................................... 9930589

(51) Int. Cl.
*G06F 9/455* (2006.01)
*G06F 11/36* (2006.01)

(52) U.S. Cl. ........................ 703/26; 712/227; 712/244; 714/38

(58) Field of Classification Search .................. 713/26; 712/227, 245; 714/38
See application file for complete search history.

(56) References Cited

U.S. PATENT DOCUMENTS

| 5,404,496 A | 4/1995 | Burroughs et al. |
| 5,430,862 A | 7/1995 | Smith et al. |
| 5,544,311 A | 8/1996 | Harenberg et al. |
| 5,564,041 A | 10/1996 | Matsui et al. |

(Continued)

FOREIGN PATENT DOCUMENTS

EP 0 667 576 A 8/1995

(Continued)

OTHER PUBLICATIONS

Search Report from the British Patent Office for British Application No. 9930589.8, filed Dec. 23, 1999.

(Continued)

*Primary Examiner*—R. Stephen Dildine
(74) *Attorney, Agent, or Firm*—Lisa K. Jorgenson; James H. Morris; Wolf, Greenfield & Sacks, P.C.

(57) ABSTRACT

A computer system for executing instructions having assigned guard indicators, comprises instruction supply circuitry, pipelined execution units for receiving instructions from the supply circuitry together with at least one guard indicator selected from a set of guard indicators, the execution unit including a master guard value store containing master values for the guard indicators, and circuitry for resolving the guard values in the execution pipeline and providing a signal to indicate whether the pipeline is committed to the execution of the instruction, and an emulator having watch circuitry for effecting a watch on selected instructions supplied to the execution pipeline and synchronising circuitry for correlating resolution of the guard indicator of each selected instruction with a program count for that instruction.

18 Claims, 6 Drawing Sheets

U.S. PATENT DOCUMENTS

| | | | |
|---|---|---|---|
| 5,644,703 A | 7/1997 | Kurakazu et al. | |
| 5,715,440 A | 2/1998 | Ohmura et al. | |
| 5,752,013 A | 5/1998 | Christensen et al. | |
| 5,754,839 A | 5/1998 | Pardo et al. | |
| 5,857,094 A | 1/1999 | Nemirovsky | |
| 2001/0005881 A1* | 6/2001 | Cofler et al. | 712/227 |
| 2001/0007125 A1* | 7/2001 | Cofler et al. | 712/226 |
| 2002/0023203 A1* | 2/2002 | Cofler et al. | 712/227 |
| 2002/0078329 A1* | 6/2002 | Roth et al. | 712/227 |

FOREIGN PATENT DOCUMENTS

| | | |
|---|---|---|
| EP | 0 810 519 | 12/1997 |
| EP | 0 849 674 | 6/1998 |
| EP | 0 869 434 A | 10/1998 |
| EP | 0 943 995 A | 9/1999 |

OTHER PUBLICATIONS

Standard Search Report from related British application No. 9930588.0, filed Dec. 23, 1999.

Standard Search Report from related British Application No. 9930590.6, filed Dec. 23, 1999.

Standard Search Report in connection with British counterpart of U.S. Appl. No. 09/748,785.

Standard Search Report in connection with British counterpart of U.S. Appl. No. 09/748,762.

Standard Serach Report in connection with British counterpart of U.S. Appl. No. 09/748,763.

Standard Search Report in connection with British counterpart of U.S. Appl. No. 09/748,077.

* cited by examiner

COMPUTER SYSTEM WITH DEBUG FACILITY

This application is a continuation of U.S. patent application Ser. No. 09/748,075 filed on Dec. 22, 2000, now abandoned.

The invention relates to a computer system with local on-chip debug facility.

BACKGROUND OF THE INVENTION

With highly embedded high performance digital processors it is advantageous to provide debug facilities on-chip. Digital signal processors may operate with pipelined execution of each instruction in a sequence of instructions. Furthermore the instructions may be guarded or predicated instructions which include a prediction or guard value so that the execution of the instruction depends on resolution of the guard value. It is understood that "prediction" and "guard" have the same meaning as the term "guard" will be used hereafter. In the case of long execution pipelines using guarded instructions, the guard value may well not be resolved until the instruction is well into the pipeline and has been followed by one or more successive instructions entering the pipeline. For debugging or emulation systems problems can arise in determining which instruction or program count gave rise to a particular watched condition in the case where guarded instructions are executed in long pipelines with resolution of the guard value occurring after the instruction enters the execution pipeline.

It is an object of the present invention to provide an improved computer system and method of operating a computer system in which a debugging or watch procedure is enabled by synchronisation of two or more events even when guarded instructions are executed in an execution pipeline.

SUMMARY OF THE INVENTION

The invention provides a computer system for executing instructions having assigned guard indicators, which system comprises instruction supply circuitry, at least one pipelined execution unit for receiving instructions from the supply circuitry together with at least one guard indicator selected from a set of guard indicators, said execution unit including a master guard value store containing master values for the guard indicators in said set of guard indicators, and circuitry for resolving the guard value of the or each guard indicator in the execution pipeline and providing a signal to indicate whether the pipeline is committed to the execution of the instruction, said system including an emulator having watch circuitry for effecting a watch on selected instructions supplied to the execution pipeline and synchronising circuitry for correlating resolution of the guard indicator of each selected instruction with a program count for that instruction.

Preferably said watch circuitry is arranged for watching instruction fetch addresses supplied to a program memory and providing an indication that the instruction is selected prior to decoding the instruction.

Preferably the emulator includes data watch circuitry for providing an output signal to said synchronising circuitry to indicate detection of a selected data value or address output by the execution pipeline.

Preferably the emulator includes load/store detection circuitry to indicate execution of a load or store operation by said execution pipeline.

Preferably said synchronising circuitry comprises a plurality of multivalue buffers each arranged to hold successive values in an ordered sequence.

Preferably said clocked buffers comprise a plurality of FIFO's.

Preferably said FIFO's include at least one for the program counter selected instructions and one for commit indicators after resolution of the guard values for the selected instructions.

Preferably a plurality of execution units are provided in parallel and a plurality of instructions are dispatched simultaneously to respective execution pipelines.

Preferably all guard indicators of instructions selected for watching by the emulator and dispatched simultaneously to a plurality of pipelines are supplied to one or more pipelines having access to said master guard value store.

The invention also provides a method of executing instructions in a computer system, said instructions having assigned guard indicators, and effecting a debugging watch on execution of said instructions, which method comprises supplying a plurality of instructions to at least one pipeline execution unit, resolving the guard value of each instruction in the execution unit to provide a commit signal if the instruction is executed, and effecting a debugging watch by selecting instructions in an instruction fetch operation and providing a program count signal for said selected instructions, storing the program count in a sequential buffer, and storing in a further sequenced buffer commit signals derived from resolution of the guard value in the execution pipeline thereby synchronising the program count with resolution of the guard value for the selected instruction.

Preferably a plurality of other parameters are watched by the debugging routine and detection of the parameters is stored in further buffers which hold entries in an ordered sequence for synchronisation with the commit signals and program counts.

Preferably the occurrence of events which are watched by the debugging hardware are held in respective first in first out buffers.

Preferably the debugging routine provides a trace or profile of events related to the program count of a watched instruction for which a commit signal was provided by the execution pipeline.

Preferably a plurality of instructions are supplied simultaneously to a plurality of parallel execution pipelines the resolution of guard values for each of the instructions being effected during passage through the execution pipeline.

DESCRIPTION OF THE PREFERRED EMBODIMENT

Figure 1:
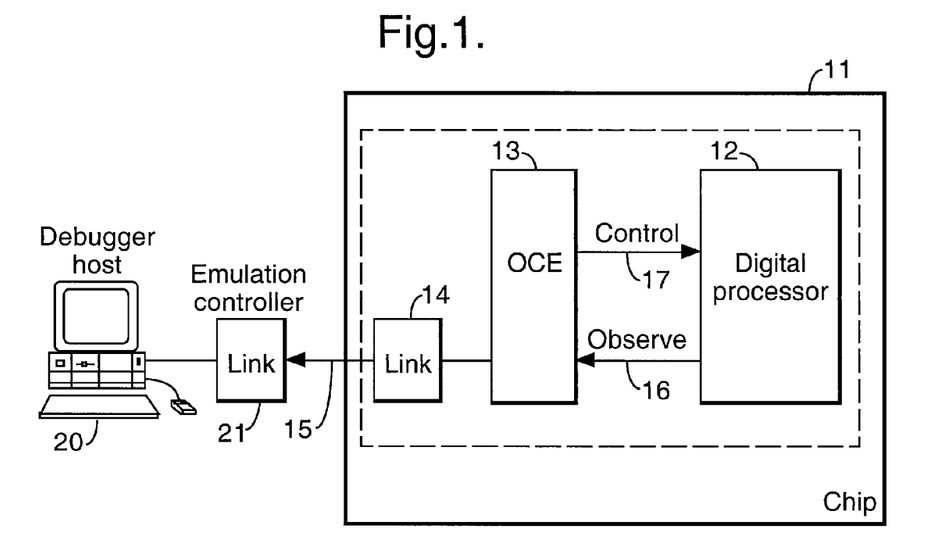
FIG. 1 is a schematic overview of a debugging system applied to a single chip digital signal processor in accordance with the present invention.

FIG. 1 shows a single integrated circuit chip 11 on which is formed a digital signal processor 12. On the same chip is formed a debugging system in the form of an on-chip emulation device (OCE)13. The emulator 13 is connected through an on-chip link 14 to provide an external connection which may comprise a JTAG port 15. The emulation device 13 may observe various conditions in the digital signal processor 12 by means of a connection 16 and it may control the operation of various units within the digital signal processor 12 by a control connection 17. A debugger host 20 of conventional operation is connected through a link 21 to the port 15 so as to be able to control and observe the on-chip emulator 13. The on-chip emulator 13 can operate autonomously implementing certain control routines through connection 17 in response to observed conditions on line 16. The emulator 13 includes an on-chip emulation program memory which holds debugging code ready for execution by the processor 12 when the emulator 13 has control of the processor 12. The connection through the port 15 also allows the processor 12 to be controlled directly by the off-chip debugger host 20 via the links 14 and 21.

Figure 2:
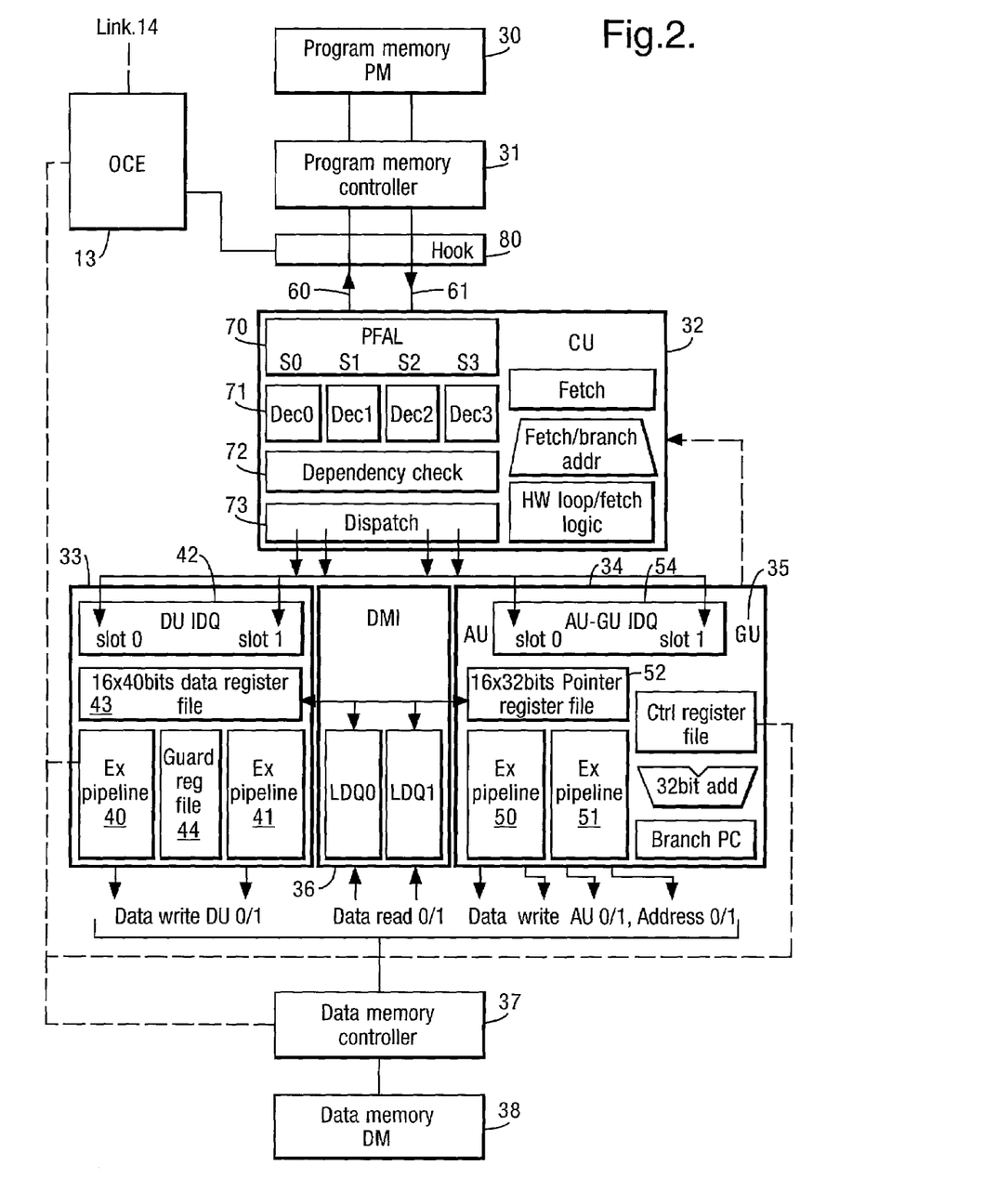
FIG. 2 illustrates in more detail components of the single chip digital signal processor and on-chip emulation system.

More detail of the processor 12 is shown in FIG. 2. The main units of the processor 12 comprise a program memory 30, a program memory controller 31, a control unit 32, a data execution unit 33, an address execution unit 34 together with a general execution unit 35, a data memory interface 36, a data memory controller 37 and a data memory 38. The data execution unit 33 has two parallel execution pipelines 40 and 41 representing slot 0 and slot 1 for the data unit 33. The unit also includes an instruction dispatch queue 42 for the two execution pipelines as well as a common data register file 43 and a guard register file 44 holding the architecturally correct values of the guards which are supplied with instructions to either the data unit 33 or address unit 34 or general unit 35. The guard register file 44 is systematically updated by both the data unit and the address unit. Similarly the address unit 34 includes two execution pipelines 50 and 51 for executing instructions in slot 0 or slot 1 of the address unit. The unit also includes a common pointer register file 52. Instructions are fed to the two pipelines 50 and 51 from a common instruction dispatch queue 54. The general unit 35 includes a pipelined execution unit which may derive instructions from the instruction dispatch queue 54 and may be used for generating branch addresses for instruction fetches.

The data unit 33 is used for executing arithmetic operations and includes add and multiply and accumulate circuitry. The address unit 34 is used for executing memory access instructions and includes some arithmetic circuitry. Similarly the general unit 35 includes some arithmetic circuitry. The supply of instructions to slot 0 or slot 1 of the data unit 33 and address unit 34 is controlled by the control unit 32. This unit is operable to generate an instruction fetch address determined by a program count (PC). This is supplied on line 60 through the program memory controller 31 to address the program memory (PM) 30. In this case a 16 byte (128 bit) line is fetched from the memory 30 in each fetch operation. This may include instructions in three different modes as will be described below. The fetched line is supplied through the memory controller 31 into the control unit 32 from line 61. The instructions in the program memory may be arranged in GP16 mode in which case each instruction is 16 bits long. Alternatively GP32 mode may be used in which each instruction is 32 bits long. VLIW instruction mode is also available in which case four 32 bit long instructions are incorporated in the single fetch operation. The control unit 32 receives the instruction line from the memory 30 and supplies micro instructions-to the instruction dispatch queues 42 or 54 of the data unit 33 or address unit 34. The manner in which the control unit generates the microinstructions from the instruction line received via connection 61 will be described with reference to FIG. 4. Generally, the control unit 32 has a program fetch align unit 70 which determines which instructions in slots S0–S3 of the fetched line from memory 30 are to be aligned for simultaneous dispatch to the data or address unit. These instructions forming a single line for dispatch are decoded by decode circuitry 71 and after a dependency check on those instructions by circuitry 72 microinstructions are generated in a dispatch unit 73 connected to the inputs to the data unit 33 and address unit 34.

When the OCE 13 is not in use, the control unit 32 will fetch instructions from the program memory 30 in accordance with a program count determined by the control unit 32. The instructions will be fed sequentially into the execution pipelines of the data unit 33 and address unit 34. Those instructions will include guard values which will be resolved within the pipelines of the data unit 33. It will be understood that if the guard value is resolved as false, then the instruction will not be executed although it has entered the pipeline. Once circuitry 73 has dispatched an instruction into one of the execution pipelines the instructions will proceed through the remaining stage of the pipeline even though the resolution of the guard value may cause the execution unit to treat the instruction as a non-operation NOP. The execution of instructions in the normal manner may require accesses for load or store into the data memory 38 and this can be carried out through the data memory controller 37 which includes a plurality of queues for load or store operations. In some cases the address and/or data for storing may be supplied to the data memory controller 37 before resolution of the guard values so that the final memory access may be dependent on supply of the resolved guard value to the data memory controller 37. Data which is to be loaded from the data memory 38 may be fed to load data queues in the data memory interface 36 prior to loading into registers of the data unit 33 or address unit 34 dependent on the resolved guard value.

The emulator 13 is required to provide a trace or profile of program counts used in both linear and jump program sequences. It may be required to set up a number of hardware break points such as program count watch points, data watch points or register watch points. It may also set up software break points and provide a data trace or profile. It may also cause program stall and step-by-step execution and provide a time stamp facility.

Figure 3:
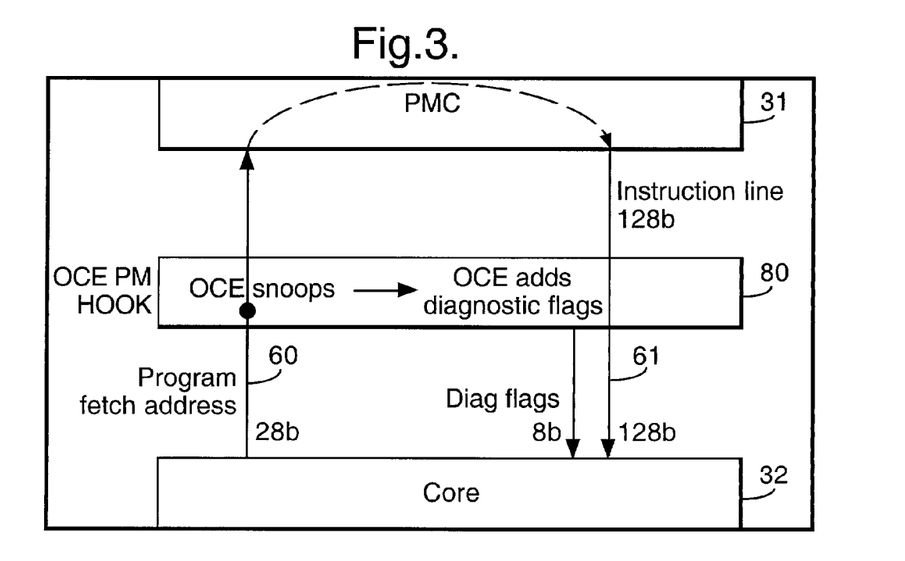
FIG. 3 illustrates in more detail part of the apparatus of FIG. 2.

In order to provide a trace of all the program count values of instructions which are fetched, it is necessary to distinguish between those instructions which are received by the control unit 32 and those which are executed after resolution of the guard values. It will be appreciated that the program fetch operation can be considered as speculative as it is not known at that time whether the guard value will be resolved in such a way that the instruction will be executed within the pipeline. If the guard value resolution causes the instruction to be executed then the instruction is herein referred to as "committed". The emulator 13 needs to be able to recover the program count of all instructions that enter the pipeline as well as the associated guard value and other information so as to reconstruct program count trace for all committed instructions. To do this, the emulator 13 must snoop all program fetch operations as shown in FIG. 3. The emulator 13 is connected to hook circuitry 80 which snoops the fetch address on line 60 supplied to the program memory controller 31 from the control unit 32. If the emulator 13 requires a watch on a fetch address supplied on line 60 then it causes the hook circuit 80 to add diagnostic flags to the instruction line supplied on line 61. As already explained, the instruction line fetched from memory 30 is 128 bits but the hook circuit 80 adds an additional 8 bits in the form of diagnostic flags to indicate to the control unit 32 how the program line which has been fetched is to be handled in the generation of microinstructions within the control unit 32 and what interaction with the OCE 13 is required.

Figure 4:
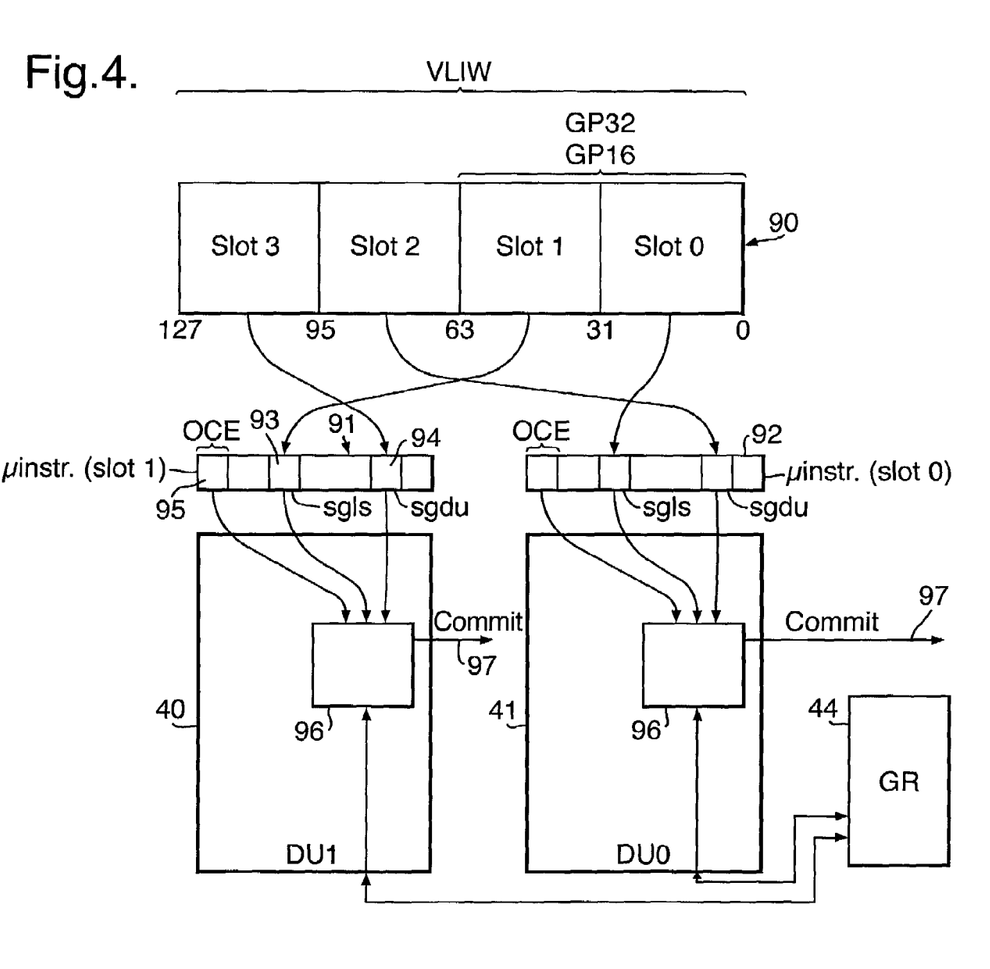
FIG. 4 illustrates the way in which microinstructions are generated and supplied to part of the apparatus of FIG. 2.

FIG. 4 illustrates one fetched line 90 from the program memory having four slots—slot 0–slot 3 each of 32 bits. When the processor is operating in VLIW mode, this line includes four 32 bit instructions which will be fed to the processor simultaneously. In the case of GP16 mode, the line will include two instructions in each slot whereas in GP32 mode one instruction will be located in each slot. Although multiple instructions are included in the slots of line 90, in GP16 and GP32 mode only two instructions are aligned and used to generate microinstructions for feeding simultaneously into the execution pipelines. It is only in the case of VLIW instructions that instructions from all four slots are aligned and supplied simultaneously to the execution units. In that case two instructions will be supplied to the two pipelines of the data unit and two instructions will be supplied to the pipelines of the address unit. The format of each Data Unit microinstruction is illustrated at 91 and 92 in FIG. 4. Each of these microinstructions is of similar format and has a plurality of fields some of which indicate the Opcode of the instruction and some indicate source and destination registers for values used in execution of the instruction. To handle the guard values with each instruction, each of these microinstructions has two separate guard value fields. Field 93 is provided for a guard value associated with a load store operation and field 94 has a guard indicator for the arithmetic operation of the data unit. The provision of the diagnostic flags added as an additional 8 bits to the signal on line 61 fed to the control unit 32 will cause the microinstruction generation to include four OCE bits in field 95. These OCE bits are used to effect control required by the emulator 13 and may include the supply of various values to the OCE 13 and can be used to cause inversion of a guard value for any instruction which is guarded on a false guard. Falsely guarded instructions can be committed if the guard value is read as false and consequently inversion is needed for selected instructions controlled by the emulator 13. In the event of a VLIW instruction being fetched when the emulator 13 wishes to carry out a watch, the guard values for each of the four instructions in line 90 are supplied to the microinstructions for the data unit although of course two of the instructions will be executed by the pipelines within the address unit. This is illustrated in FIG. 4 where the guard value from slot 0 is fed to field 93 of the microinstruction used for slot 0 of the data unit 33. The guard value of slot 1 of line 90 is fed to field 93 of the microinstruction supplied to slot 1 of the data unit 33.

The guard value of slot 2 of line 90 is fed to field 94 of the microinstruction fed to slot 0 of the data unit 33. The guard value of slot 3 of line 90 is supplied to field 94 of the microinstruction supplied to slot 1 of the data unit 33. In this way, all four guard values are supplied to the data unit where the guard value can be resolved by reference of the guard indicators to the master guard register file 44 in the guard unit. This is done by circuitry 96 within each execution unit of the data unit 33 so as to provide a commit output signal 97 in the event of the guard indicator being resolved as a true guard value thereby requiring execution of the instruction, the commit output 97 has the value 1. For a guard resolved as false, the commit output would be zero.

Figure 5:
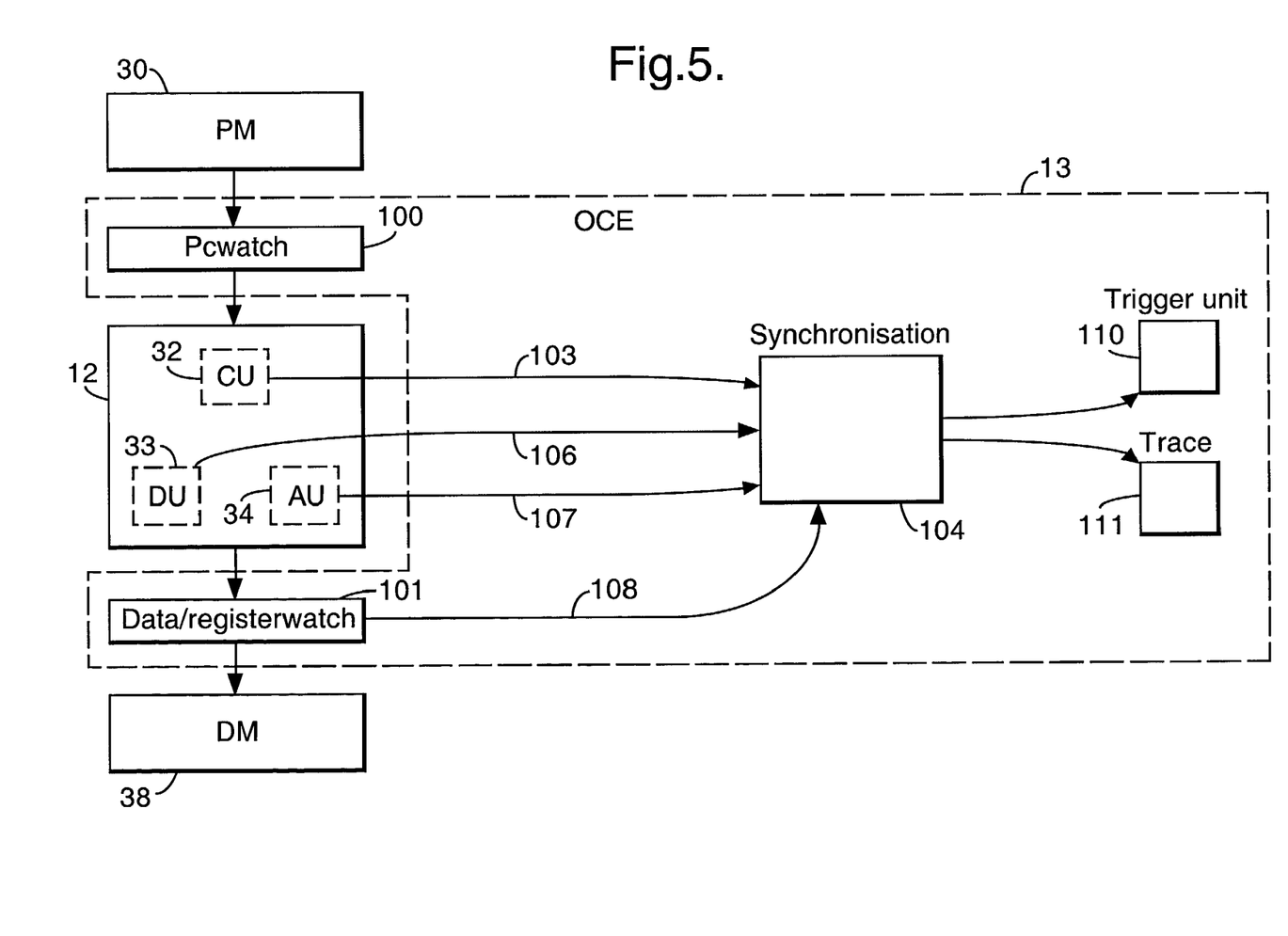
FIG. 5 shows schematically the supply of signals from the apparatus of FIG. 2 to the on-chip emulator.

In operation of the emulator 13, it may carry out various watches on events occurring within the processor. This is illustrated in FIG. 5 in which the emulator 13 is shown as carrying out a program count watch 100 on instructions fetched from the program memory and supplied to the control unit 32. It may also watch data accesses (load or store) between the core and the data memory via the data memory controller. This is shown in FIG. 5 as a data/register watch 101 which may watch addresses used for data memory accesses in the local data memory or errors in a system memory. The data/register watch of FIG. 5 is carried out by a data memory hook 80 as shown in FIG. 2. Indications of the program count which has been watched are supplied by the control unit 32 on line 103 to a synchronisation unit 104. A commit signal of zero or one is generated by the data unit 33 when the guard value has been resolved by the data unit thereby indicating whether the instruction is executed or not. The commit signal is provided on line 106 to the synchronisation unit 104. Line 106 corresponds to line 97 of FIG. 4. Similarly when a load or store operation is executed by the address unit 34 a signal is provided on line 107 to the synchronisation unit 104 to indicate if a load or store is sent or not sent to the memory controller 37. A watch hit on particular addresses and/or data values is provided on line 108 to the synchronisation unit 104. The synchronisation unit comprises a plurality of FIFO's which will be described with reference to FIG. 6. The output of the synchronisation unit 104 is fed to a trigger unit 110 when the result of synchronisation requires a trigger operation by the emulator 13. It also supplies an output to a trace unit 111 in order to establish a required trace in the emulator 13.

Figure 6:
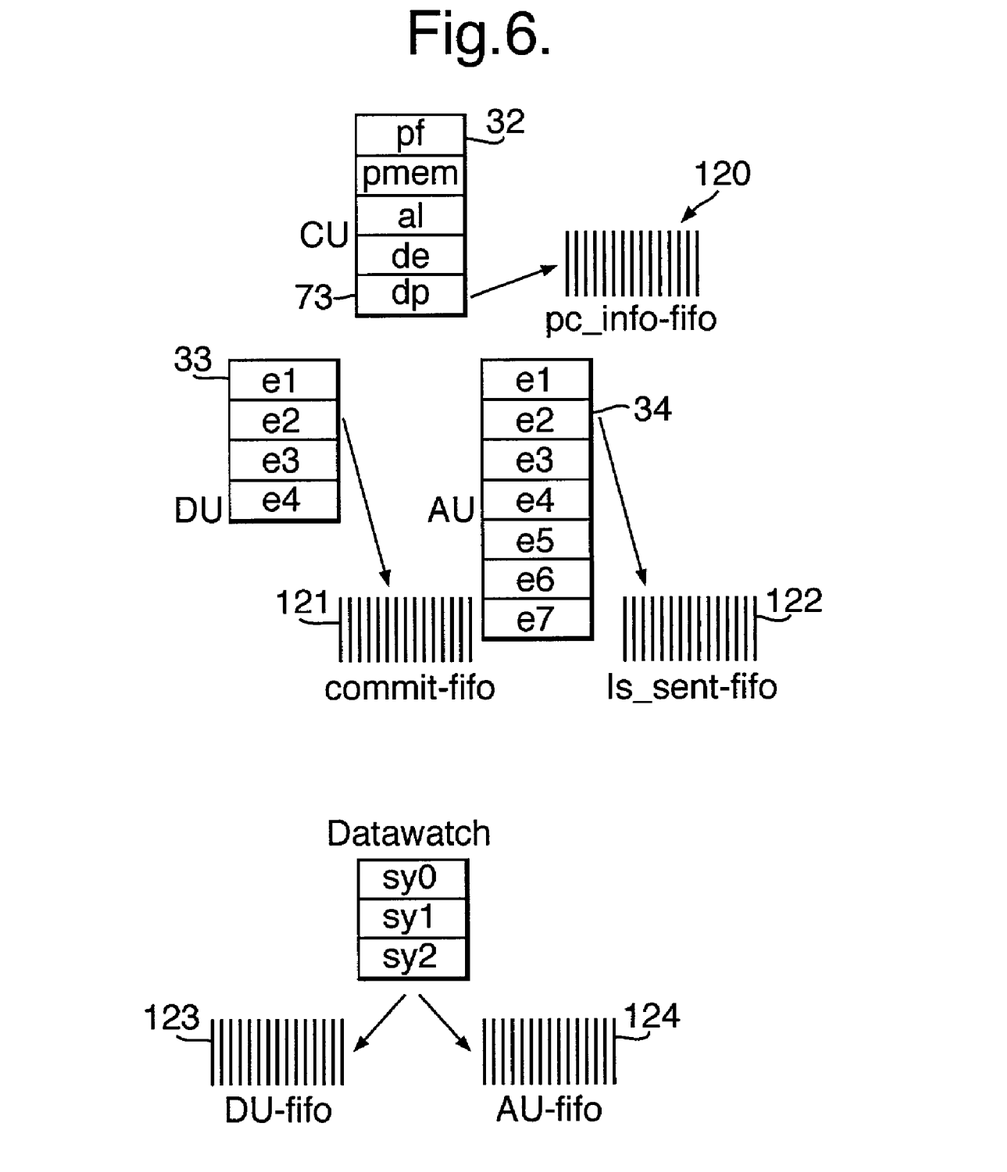
FIG. 6 illustrates the operation of a plurality of FIFO's in the apparatus of FIG. 5.

The mechanism used in the synchroniser 104 will be explained with reference to FIG. 6. As instructions are fed through the pipeline of the control unit 32, instructions are output by the dispatch stage 73 which supplies to a program count FIFO (first in first out buffer) 120 an indication of the program count and an indication if the instruction is a load or store instruction. As the instruction passes through the pipeline stages of the data unit 33 the guard value is resolved by hardware provided in the data unit for the normal execution of instructions in the data unit and is not additional hardware for use solely by the debugging operation. In this example the resolution is shown as occurring at stage e2 in the pipeline and the commit signal indicating whether the guard value is resolved as true or false is supplied to a commit FIFO 121. When a load/store instruction is executed in the pipeline within the address unit 34 a signal is sent to a load store sent FIFO 122 to indicate whether or not the load/store has been sent by the address unit to the data memory controller 37. FIFO 120 receives its signals on line 103 of FIG. 5. FIFO 121 receives its signals on line 106 of FIG. 5. FIFO 122 receives its signals on line 107 in FIG. 5. Similarly, the data watch 101 watches an address or data value to detect hits on inputs to the data memory controller 37 from the data unit and the address unit. It provides outputs on lines 108 to the respective data unit FIFO 123 or address unit FIFO 124 to indicate whether hits have been detected or not from the respective data or address units. Signals on line 108 of FIG. 5 supply hit or miss signals to the FIFOs 123 and 124.

The timing of the synchronisation system 104 will be explained with reference to FIG. 7. The cycles of operation of instruction fetches, execution pipelines and memory accesses are controlled by clock cycles with a clock signal as shown at 130 in FIG. 7. The Figure illustrates seven successive clock cycles and in this example the program count of the instruction dispatch by circuitry 73 occurs in cycle 2 as shown in the program count line 131. The commit signal is sent out in cycle 4 as shown in line 132. The load/store signal from the address unit is provided in cycle 5 as shown in line 133. The address comparison for the load store is carried out in cycle 7 as shown in line 134 and in this example the data comparison is carried out in cycle 8 as shown in the data comparison line 135. It will be appreciated that the signal on line 131 was fed into FIFO 120. The signal on line 132 was fed into FIFO 121. The signal on line 133 was fed into FIFO 122. The signal on line 134 was fed into FIFO 124. The data signal from line 135 is fed into FIFO 123. Each of the FIFO's 120, 121, 122, 123 and 124 operate on synchronised clock cycles from the clock signal shown in FIG. 7. Each of the FIFO's 120–124 is then read in clock cycle 9 as shown by lines 136, 137, 138, 139 and 140 in FIG. 7. The result of reading each of those FIFO's on the same clock cycle 9 will indicate correlation between a commit signal and any of the events watched on lines 131–135. The emulator 13 can therefore through use of the synchronisation circuitry 104 establish the program count which was associated with a committed instruction and one which gave rise to a watched event by either the PC watch 100 or data or register watch 101. The synchronisation unit 104 may operate the trigger unit 110 or trace unit 111 or both of these units in order to carry out the required debugging operation and provide the required trace or profile.

Figure 7:
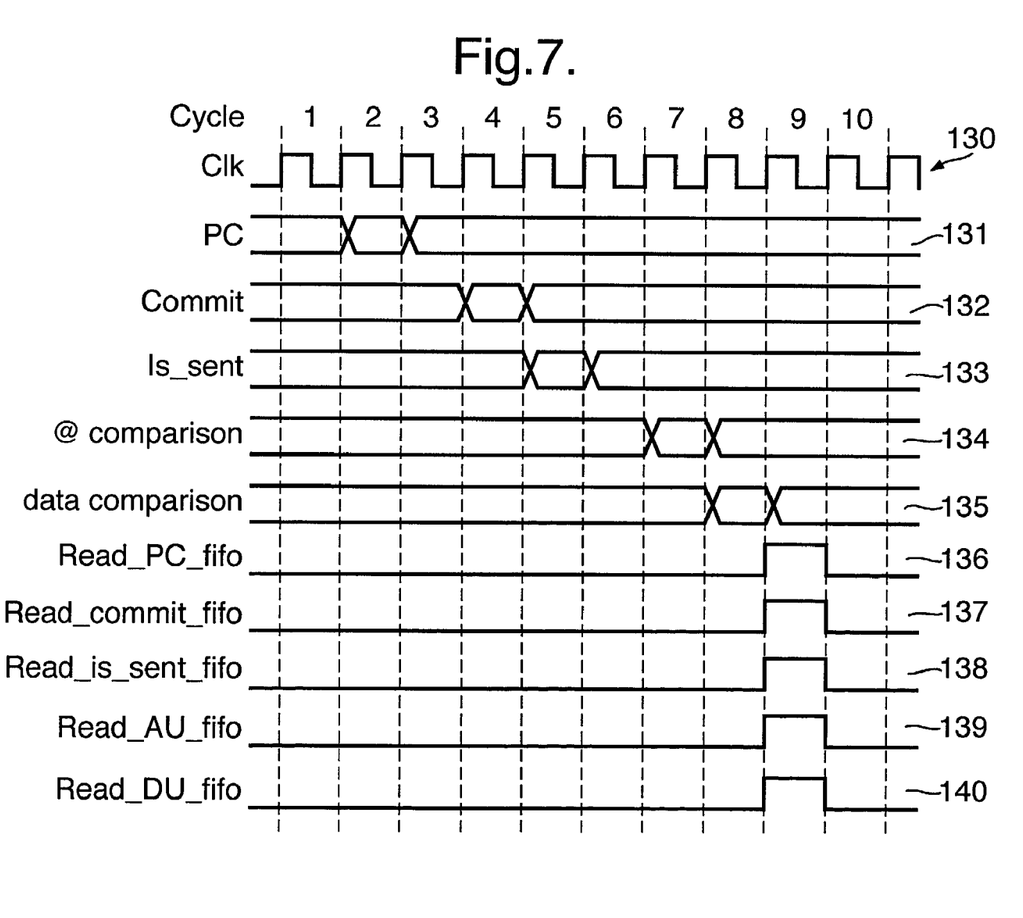
FIG. 7 illustrates a timing diagram for the operation of the apparatus of FIGS. 5 and 6.

In the example of FIG. 7 the data watch was carried out on a store operation for the contents of the data unit register. It will however be appreciated that store operations may be carried out on the contents of an address unit register and in that event, the address unit will output the address and the data to be stored on the same cycle of operation. When the store operation relates to data held in a data unit register, the address unit will output the address on a different cycle from the data unit outputting the data which is to be stored. For this reason separate FIFOs 123 and 124 are provided for the data watch unit. These FIFOs 123 and 124 only store whether there has been an address or data hit and they do not give the address or data itself. When hits are detected, the emulator 13 only needs to check FIFOs 123 and 124 if the program count FIFO 120 has indicated that there is a load/store instruction and the FIFO 122 confirms that the load/store has been sent by the address unit to the data memory controller 37.

The emulator 13 may cause the control unit 32 to divert the next program fetch by responding to diagnostic flags to cause deviation of the next program fetch address on line 60 so as to obtain instructions from a debug program memory rather than the normal program memory 30.

It will be understood that in the above example each of the FIFOs provides a buffer for holding entries as an ordered queue. Read and write operation may occur on clocked cycles so as to take the oldest entry from the queue or to add a newest entry to the queue. Each buffer may receive a read or write command which may be selectively activated in synchronism with a clock. Each FIFO has a full and empty signal generator either indicating that there is no further queue space or that the buffer is empty. Each of the units shown in FIG. 5 for providing signals to the synchronisation buffers 104 may write its data into its corresponding FIFO on any clock cycle when it has resolved the data that it wishes to write into the FIFO. It is however important that each stage write its successive data values into its respective FIFO in an ordered manner so that resynchronisation is effected by the emulator circuitry by reading out of the relevant FIFOs when all the data is ready so that the values read out all correspond to the same order position in the queues held by each FIFO. For example, when the instruction dispatch stage writes program count values into FIFO 120, a number of entries will be made in FIFO 120 before the data unit is able to write the first commit value into the commit FIFO 121. For a few cycles, the program count FIFO 120 will progressively accumulate data while the commit FIFO 121 remains empty with its empty signal active. The emulator circuitry reads the empty signals as these indicate if there is any data. As soon as the commit FIFO-is written with its first data the empty signal deactivated and the emulator logic can read out of the PC FIFO 120 and the commit FIFO 121 simultaneously. It thereby obtains the first program count value and the first commit value which are resynchronised. The execution of instructions in the core of the processor 12 operates in an in-order manner so that the FIFOs shown in FIG. 6 always receive their data in order with respect to the program flow.

The invention is not limited to the details of the foregoing example.

What is claimed is:

1. A computer system for executing instructions having assigned guard indicators, which system comprises instruction supply circuitry, at least one pipelined execution unit for receiving instructions from the supply circuitry together with at least one guard indicator selected from a set of guard indicators, said execution unit including a master guard value store containing master values for the guard indicators in said set of guard indicators, and circuitry for resolving the guard value of the or each guard indicator in the execution pipeline and providing a signal to indicate whether the pipeline is committed to the execution of the instruction, said system including an emulator having watch circuitry for effecting a watch on selected instructions supplied to the execution pipeline and synchronizing circuitry for correlating resolution of the guard indicator of each selected instruction with a program count for that instruction.

2. A computer system according to claim 1 in which said watch circuitry is arranged for watching instruction fetch addresses supplied to a program memory and providing an indication that the instruction is selected prior to decoding the instruction.

3. A computer system according to claim 1 in which the emulator includes data watch circuitry for providing an output signal to said synchronizing circuitry to indicate detection of a selected data value output by the execution pipeline.

4. A computer system according to claim 1 in which the emulator includes load/store detection circuitry to indicate execution of a load or store operation by said execution pipeline.

5. A computer system according to claim 1 in which the emulator includes memory access address watch circuitry to indicate detection of a selected memory access address by said execution pipeline.

6. A computer system according to claim 1 in which said synchronizing circuitry comprises a plurality of multivalue buffers each arranged to hold successive values in an ordered sequence.

7. A computer system according to claim 6 in which said buffers comprise a plurality of FIFOs.

8. A computer system according to claim 7 in which said FIFOs include at least one for the program count of selected instructions.

9. A computer system according to claim 7 in which said FIFOs include at least one for commit indicators after resolution of the guard values of instructions supplied to the execution pipeline.

10. A computer system according to claim 7 in which said FIFOs include at least one for indicating whether load/store instructions have been executed in the execution unit.

11. A computer system according to claim 7 in which said FIFOs include at least one for indicating execution of a data memory access instruction where the data and/or address provide the hit with a watched value of the data and/or address.

12. A computer system according to claim 1 in which a plurality of execution units are provided in parallel and a plurality of instructions are dispatched simultaneously to respective execution pipelines.

13. A computer system according to claim 12 in which all guard indicators of instructions dispatched simultaneously to a plurality of pipelines are supplied to one or more pipelines having access to said master guard value store when the watching circuitry of said emulator has selected said instructions.

14. A method according to claim 12 in which the debugging routine provides a trace or profile of events related to the program count of a watched instruction for which a commit signal was provided by the execution pipeline.

15. A method according to claim 12 in which a plurality of instructions are supplied simultaneously to a plurality of parallel execution pipelines the resolution of guard values for each of the instructions being effected during passage through the execution pipeline.

16. A method of executing instructions in a computer system, said instructions having assigned guard indicators, and effecting a debugging watch on execution of said instructions, which method comprises supplying a plurality of instructions to at least one pipelined execution unit, resolving the guard value of each instruction in the execution unit to provide a commit signal if the instruction is executed, and effecting a debugging watch by selecting instructions in an instruction fetch operation and providing a program count signal for said selected instructions, storing the program count in a sequential buffer, and storing in a further sequenced buffer commit signals derived from resolution of the guard value in the execution pipeline thereby synchronizing the program count with resolution of the guard value for the selected instruction.

17. A method according to claim 16 in which a plurality of other parameters are watched by the debugging routine and detection of the parameters is stored in further buffers which hold entries in an ordered sequence for synchronisation with the commit signals and program counts.

18. A method according to claim 16 in which the occurrence of events which are watched by the debugging routine are held in respective first in first out buffers.

* * * * *